(12) United States Patent
Clipsham

(10) Patent No.: US 7,920,878 B2
(45) Date of Patent: *Apr. 5, 2011

(54) LOCATION BASED REMINDERS

(75) Inventor: Andrew Charles Clipsham, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/510,002

(22) Filed: Jul. 27, 2009

(65) Prior Publication Data

US 2009/0286557 A1    Nov. 19, 2009

Related U.S. Application Data

(63) Continuation of application No. 11/399,005, filed on Apr. 5, 2006, now Pat. No. 7,583,972.

(51) Int. Cl.
*H04W 24/00* (2009.01)

(52) U.S. Cl. .................. 455/457; 455/456.6; 455/456.3; 455/567; 455/418

(58) Field of Classification Search ....... 455/456.1–457, 455/418–420, 550.1, 552.1, 567, 402; 340/539.1–539.13, 825.36, 825.49; 701/207, 701/213
See application file for complete search history.

(56) References Cited

U.S. PATENT DOCUMENTS

| | | | |
|---|---|---|---|
| 6,360,101 B1 * | 3/2002 | Irvin | 455/456.6 |
| 7,583,972 B2 * | 9/2009 | Clipsham | 455/457 |
| 2002/0086680 A1 * | 7/2002 | Hunzinger | 455/456 |

* cited by examiner

*Primary Examiner* — Kamran Afshar
(74) *Attorney, Agent, or Firm* — Kacvinsky Daisak, PLLC

(57) ABSTRACT

Location based reminders are described. A mobile computing device may comprise a location based reminder application to set a target location for a reminder item. The location based reminder application may provide a location based reminder for the reminder item when a current location matches the target location. Other embodiments may be described and claimed.

16 Claims, 6 Drawing Sheets

LOCATION BASED REMINDERS

BACKGROUND

A mobile computing device such as a smart phone may have voice and data communications capabilities as well as processing capabilities. The processing capabilities may allow a mobile computing device to store and execute a number of application programs, such as a personal information manager (PIM) application, for example. A PIM application may comprise a software application arranged to organize personal information for a user, such as a contact manager to manage contact information for multiple entities, a calendar manager to manage events, a task manager to manage tasks, a memo manager to manage memos, an email manager to manage email, and so forth. Typically the PIM application allows a user to set reminders for various events, tasks, memos, and emails. The reminders, however, are typically limited to a date and/or time, and therefore may not take advantage of the additional resources potentially provided by a mobile computing device.

DETAILED DESCRIPTION

Various embodiments may be generally directed to techniques for providing automatic reminders based on location of a mobile computing device. In one embodiment, for example, a mobile computing device such as a smart phone may comprise a location based reminder application and a location device. The location based reminder application may trigger reminders based on a location of the mobile computing device. For example, the location based reminder application may be used to set a target location for a reminder item. Examples of target locations may include any defined physical location, such as a location for a residence, commercial office, school, store, and so forth. Examples of reminder items may include any defined item suitable for reminders, such as calendar events, tasks, memos, emails, instant messages, and so forth. The location based reminder application may provide a location based reminder for the reminder item when a current location matches the target location. The current location may be determined by the location device, such as a global positioning system (GPS) or other location identifying device or system. In this manner, a user may be automatically reminded of a reminder item based on a location. In addition to providing location based reminders, the location based reminder application may be used with other reminder triggers, such as a date and/or time. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
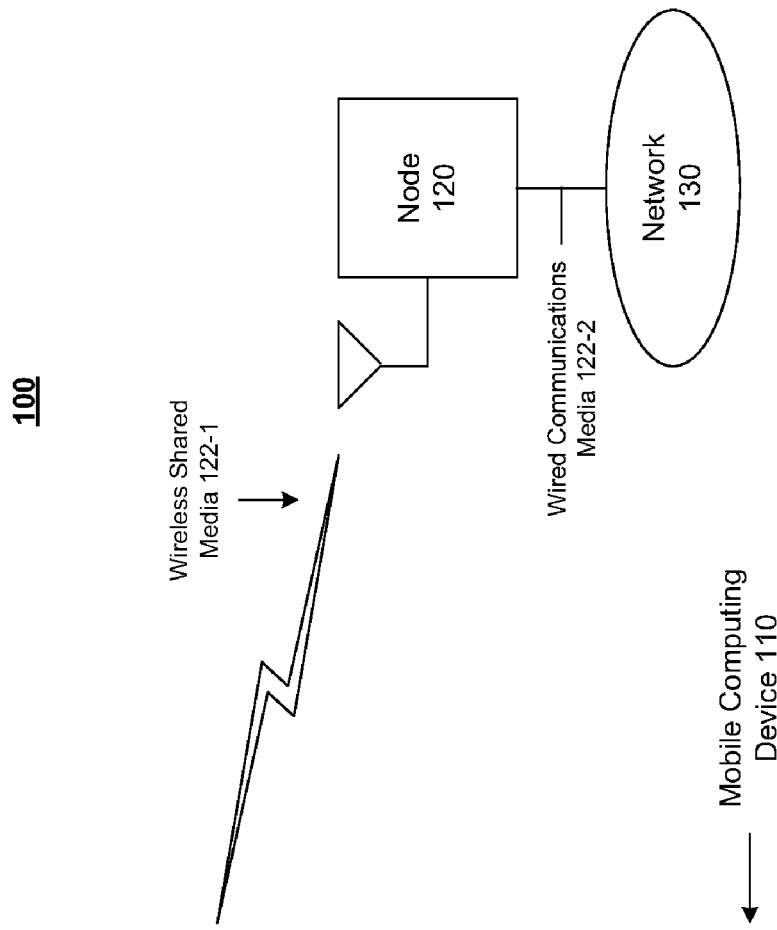
FIG. 1 illustrates one embodiment of a communications system.

FIG. 1 illustrates one embodiment of a communications system 100. In various embodiments, communications system 100 may be implemented as a wireless communication system, a wired communication system, or a combination of both. When implemented as a wireless communication system, communications system 100 may include components and interfaces suitable for communicating over wireless shared media 122-1, such as one or more antennas, transmitters, receivers, transceivers, amplifiers, filters, control logic, and so forth. An example of wireless shared media 122-1 may include portions of a wireless spectrum, such as the RF spectrum and so forth. When implemented as a wired communications system, communications system 100 may include components and interfaces suitable for communicating over wired communications media 122-2, such as input/output (I/O) adapters, physical connectors to connect the I/O adapter with a corresponding wired communications medium, a network interface card (NIC), disc controller, video controller, audio controller, and so forth. Examples of wired communications media 122-2 may include a wire, cable, metal leads, printed circuit board (PCB), backplane, switch fabric, semiconductor material, twisted-pair wire, co-axial cable, fiber optics, and so forth. The embodiments are not limited in this context.

In various embodiments, communications system 100 may include a mobile computing device 110. Mobile computing device 110 may comprise any device having a processing system and a portable power source (e.g., a battery). Examples of a mobile computing device may include a computer, laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device may also include computers that are arranged to be worn by a person, such as a wrist computer, finger computer, ring computer, eyeglass computer, belt-clip computer, arm-band computer, shoe computers, clothing computers, and other wearable computers. In one embodiment, for example, mobile computing device 110 may be implemented as a smart phone having both wireless voice and/or data communications capabilities, as well as processing capabilities. Although some embodiments may be described with mobile computing device 110 implemented as a smart phone by way of example, it may be appreciated that other embodiments may be implemented using other mobile computing devices as well. The embodiments are not limited in this context.

In various embodiments, mobile computing device 110 may comprise a housing 102. Housing 102 may be made of any material suitable for encapsulating some or all of the components of mobile computing device 110, such as metal, plastic, carbon fiber, polymers, and so forth. In one embodiment, housing 102 may also have a shape, size and/or form factor capable of being held with an average human hand. In one embodiment, housing 102 may also include a slot to hold a stylus for use with a touch screen. The embodiments are not limited in this context.

In various embodiments, mobile computing device 110 may comprise an input/output (I/O) device 106. I/O device 106 may comprise any suitable I/O device for entering information into a mobile computing device. Examples for I/O device 106 may include an alphanumeric keyboard, a numeric keypad, a touch pad, a touch screen, input keys, buttons, switches, rocker switches, and so forth. In one embodiment, for example, I/O device 106 may include a four-direction rocker switch with an input button in approximately the center of the rocker switch. The embodiments are not limited in this context.

In one embodiment, mobile computing device 110 may include a display 104. Display 104 may comprise any suitable display unit for displaying information appropriate for a mobile computing device. In addition, display 104 may be implemented as an additional I/O device, such as a touch screen, touch panel, touch screen panel, and so forth. Touch screens are display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays allows a display to be used as an input device, to remove or enhance the keyboard and/or the mouse as the primary input device for interacting with content provided on display 104. The embodiments are not limited in this context.

In one embodiment, communications system 100 may include a wireless device 120. Wireless device 120 may comprise, for example, a mobile or fixed wireless device. In one embodiment, for example, wireless device 120 may comprise a fixed wireless device operating as an access point for a network or communications system, such as a cellular radiotelephone communications system, a wireless local area network (WLAN), a wireless metropolitan area network (WMAN), a wireless wide area network (WWAN), and so forth. Examples for wireless device 120 may include a wireless access point, base station or device B, base station radio/transceiver, router, switch, hub, gateway, and so forth. In one embodiment, for example, wireless device 120 may comprise a base station for a cellular radiotelephone communications system. Although some embodiments may be described with wireless device 120 implemented as a base station by way of example, it may be appreciated that other embodiments may be implemented using other wireless devices as well. The embodiments are not limited in this context.

In one embodiment, mobile computing device 110 and wireless device 120 may comprise part of a cellular radiotelephone system. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, mobile computing device 110 and wireless device 120 may be arranged to perform data communications using any number of different wireless protocols over wireless shared media 122-1. In one embodiment, for example, mobile computing device 110 and wireless device 120 may be arranged to perform data communications using any number of different WWAN data communication services. Examples of cellular data communication systems offering WWAN data communication services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth. In one embodiment, for example, mobile computing device 110 and wireless device 120 may also be arranged to communicate using a number of different WLAN data communication services. Examples of suitable WLAN data communication services may include the Institute of Electrical and Electronics Engineers (IEEE) 802.xx series of protocols, such as IEEE 802.11a/b/g/n, IEEE 802.16, IEEE 802.20, and so forth. In one embodiment, for example, mobile computing device 110 and wireless device 120 may be further arranged to communicate using a number of shorter range wireless protocols, such as a wireless personal area network (PAN) protocols, an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electromagnetic induction (EMI) techniques. An example of EMI techniques may include passive or active radio-frequency identification (RFID) protocols and devices. The embodiments are not limited in this respect.

In one embodiment, communications system 100 may include network 130 connected to wireless device 120 by wired communications medium 122-2. Network 130 may comprise additional devices and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. In one embodiment, for example, network 130 may be arranged to communicate information in accordance with one or more Internet protocols as defined by the Internet Engineering Task Force (IETF), such as the Transmission Control Protocol/Internet Protocol (TCP/IP), for example. Network 130 may also include other cellular radio telephone system infrastructure and equipment, such as base stations, mobile subscriber centers, central offices, and so forth. The embodiments are not limited in this context.

In general operation, mobile computing device 110 may be capable of storing and executing a number of application programs. One example of an application program may include any software capable of generating and setting reminder items, such as a PIM application, for example. A PIM application may comprise a software application arranged to organize personal information for a user, such as a contact manager to manage contact information and/or context information for multiple entities, a calendar manager to manage events, a task manager to manage tasks, a memo manager to manage memos, an email manager to manage email, and so forth.

Typically the PIM application allows a user to set reminders for various reminder items, such as calendar events, tasks, memos, emails, voice mails, instant messages, and so forth. For example, a user may schedule a calendar event such as an appointment or meeting. The user may schedule the calendar event by using a user interface to enter appointment information. Examples of appointment information may include a date, subject information, a start time, an end time, appointment location, and so forth. The appointment location typically includes information such as a conference room for an office where the meeting or appointment is scheduled to take place. The appointment information may further include whether to set a reminder for the appointment, and a defined time period to provide the reminder. The defined period may be in any time dimension, and is typically in minutes, hours, days, weeks, or months. For example, a user may set a location based reminder for 15 minutes before the appointment start time on the day of the appointment. The reminder may serve as a technique for providing notice or reminding a user of the appointment so that the user may prepare and attend the appointment.

Similar reminders may be set for any reminder items available via the PIM application, or any other application or system programs available on mobile computing device 110. For example, mobile computing device 110 may include other application programs such as a memo application, for example. A memo application may manage various types of reminder items in the form of memos or notes for a user. A memo may be created using different types of information, such as voice information, video information, audio information, text information, numerical information, symbols, alphanumeric symbols, graphics, images, computer generated images, pictures, icons, and so forth. The memo application may comprise part of the PIM application, or may be implemented separately, as desired for a given implementation. The embodiments are not limited in this context.

One problem with reminders for a PIM application or other application programs is that the reminders are typically limited to a date and/or time. There may be other hardware or software resources, however, implemented for mobile computing device 110 and available to the PIM application. Conventional reminder techniques may fail to take advantage of these additional resources potentially provided by mobile computing device 110.

In order to solve these and other problems, mobile computing device 110 may use various reminder techniques to manage reminders for various application or system programs for mobile computing device 110 in order to potentially enhance productivity, accessibility, and value to a user. More particularly, mobile computing device 110 may use reminder triggers based on a location for mobile computing device 110. In one embodiment, for example, mobile computing device 110 may include a location based reminder application. The location based reminder application may be used to set a target location for a reminder item. Examples of target locations may include any defined physical location, such as a location for a residence, commercial office, school, store, and so forth. The location based reminder application may provide a location based reminder for the reminder item when a current location matches the target location. The current location may be determined by a GPS or other location identifying system. In this manner, a user may be automatically reminded of reminder item based on a location either alone or in conjunction with other reminder triggers, such as a date and/or time, for example. Mobile computing device 110 in general, and location based reminder application in particular, may be described in more detail with reference to FIGS. 2-6.

Figure 2:
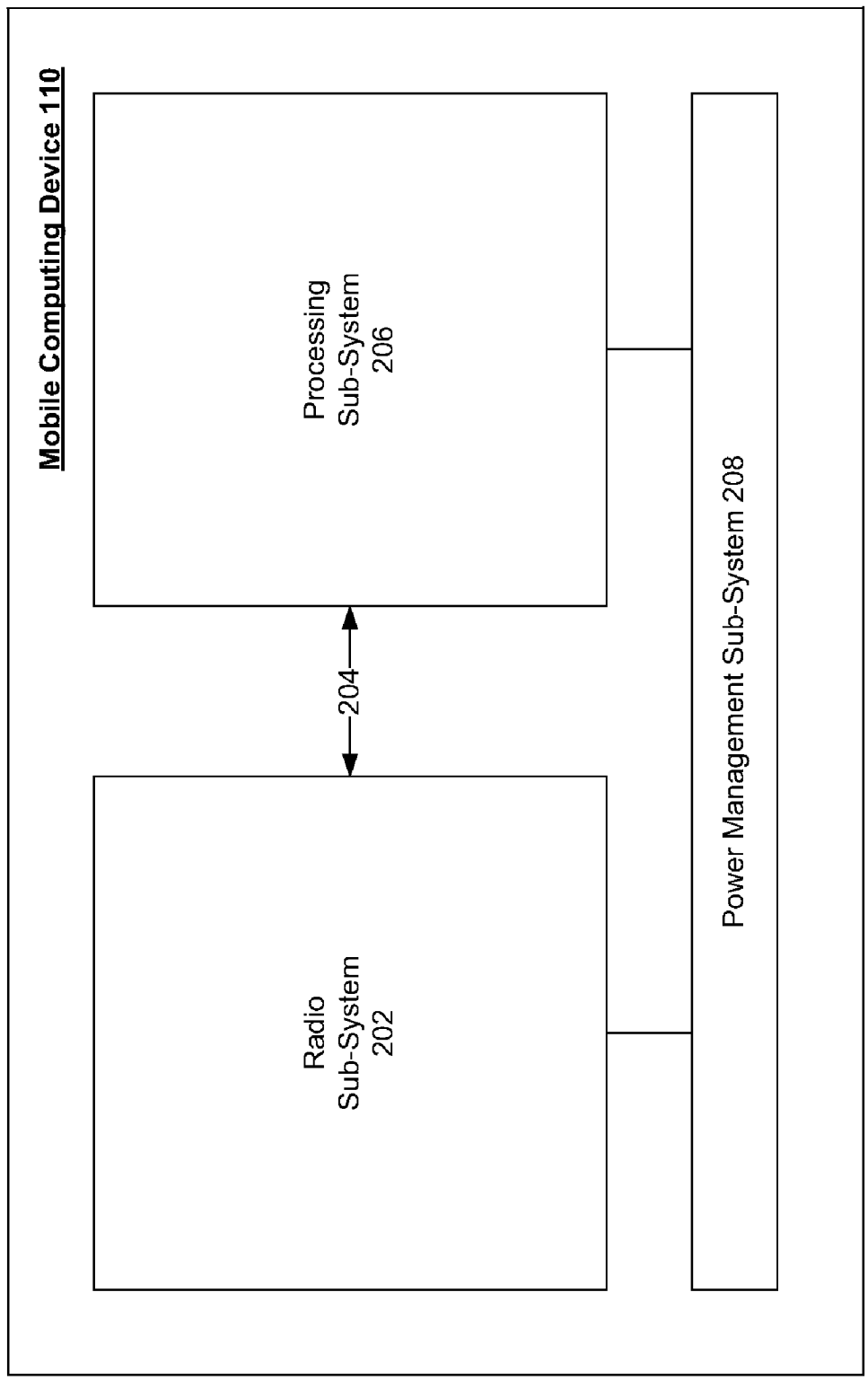
FIG. 2 illustrates one embodiment of a mobile computing device.

FIG. 2 illustrates one embodiment a mobile computing device. FIG. 2 illustrates a more detailed block diagram of mobile computing device 110 as described with reference to FIG. 1. As shown in FIG. 2, mobile computing device 110 may comprise multiple elements. Although FIG. 2 shows a limited number of elements in a certain topology by way of example, it can be appreciated that more or less elements in any suitable topology may be used in mobile computing device 110 as desired for a given implementation. Furthermore, any element as described herein may be implemented using hardware, software, or a combination of both, as previously described with reference to device implementations. The embodiments are not limited in this context.

In various embodiments, mobile computing device 110 may include a radio sub-system 202 connected via bus 204 to a processing sub-system 206. Radio sub-system 202 may perform voice and data communications operations using wireless shared media 122-1 for mobile computing device 110. Processing sub-system 206 may execute software for mobile computing device 110. Bus 204 may comprise a USB or micro-USB bus and appropriate interfaces, as well as others.

In various embodiments, mobile computing device 110 may also include a power management sub-system 208. Power management sub-system 208 may manage power for mobile computing device 110, including radio sub-system 202, processing sub-system 206, and other elements of mobile computing device 110. For example, power management sub-system 208 may include one or more batteries to provide direct current (DC) power, and one or more alternating current (AC) interfaces to draw power from a standard AC main power supply. The embodiments are not limited in this context.

Figure 3:
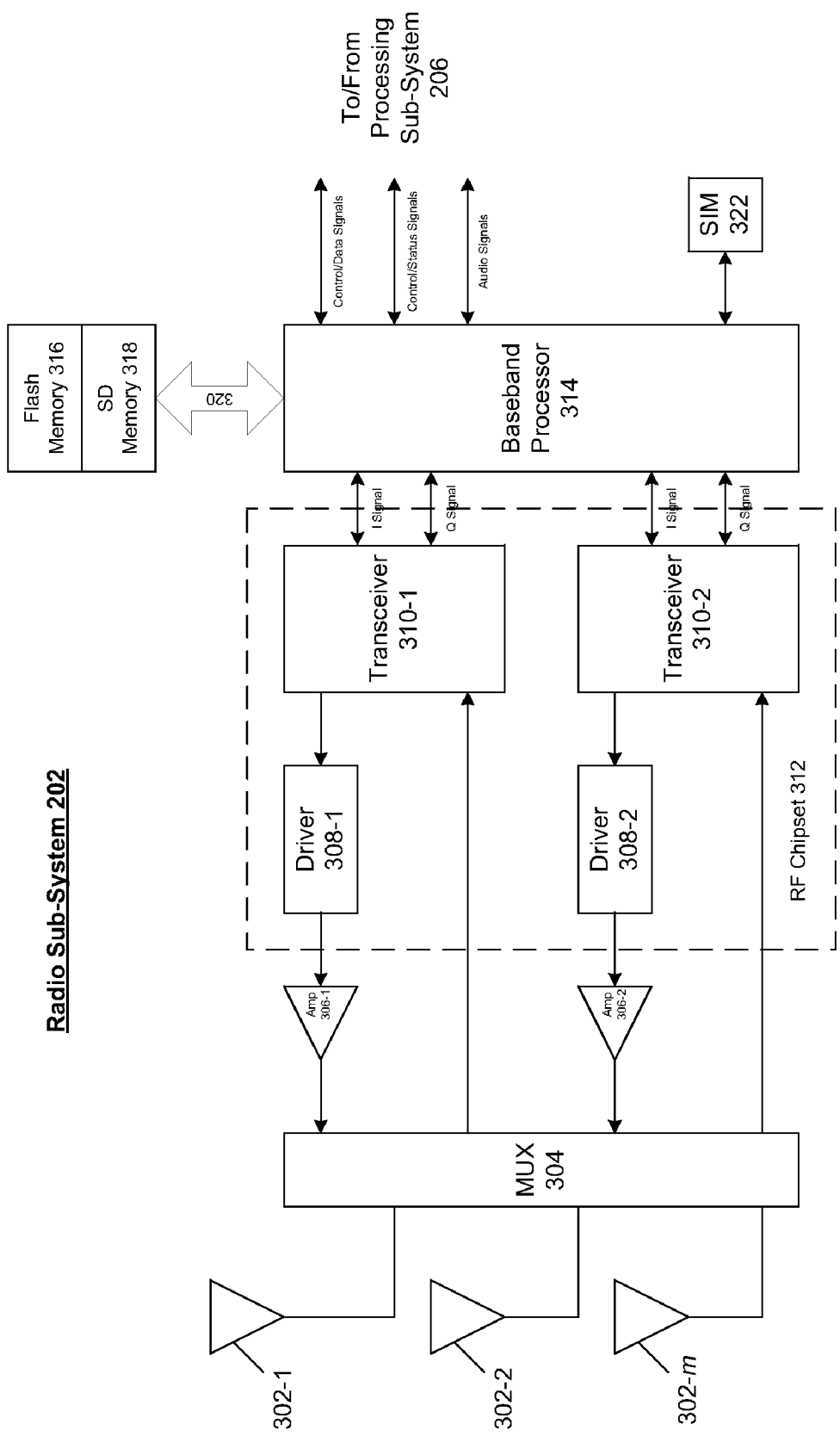
FIG. 3 illustrates one embodiment of a radio sub-system.

FIG. 3 illustrates one embodiment a radio sub-system. FIG. 3 illustrates a more detailed block diagram of radio sub-system 202 as described with reference to FIG. 2. Radio sub-system 202 may perform voice and data communication operations for mobile computing device 110. For example, radio sub-system 202 may be arranged to communicate voice information and control information over one or more assigned frequency bands of wireless shared media 122-1. The embodiments are not meant to be limited, however, to the example given in FIG. 3.

In various embodiments, radio sub-system 202 may include one or more antennas 302-1-$m$. Antennas 302-1-$m$ may be used for transmitting and/or receiving electrical signals. Examples for antennas 302-1-$m$ may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. During transmission, antennas 302-1-$m$ may accept energy from a transmission line and radiate this energy into space via wireless shared media 122-1. During reception, antennas 302-1-$m$ may gather energy from an incident wave received over wireless shared media 122-1, and provide this energy to a corresponding transmission line. The amount of power radiated from or received by antennas 302-1-$m$ is typically described in terms of gain. Radio sub-system 202 may be implemented using a single antenna 302-1, or using an array of antennas 302-1-$m$ array, such as a quad band antenna array, for example. Multiple antennas may be desirable when implementing spatial diversity and/or Multiple-Input-Multiple-Output (MIMO) systems. The embodiments are not limited in this context.

In various embodiments, antennas 302-1-*m* may be connected to a multiplexer 304. Multiplexer 304 multiplexes signals from power amplifiers 306-1, 306-2 for delivery to antennas 302-1-*m*. Multiplexer 304 demultiplexes signals received from antennas 302-1-*m* for delivery to RF chipset 312. The embodiments are not limited in this context.

In various embodiments, multiplexer 304 may be connected to power amplifiers 306-1, 306-2. Power amplifiers 306-1, 306-2 may be used to amplify any signals to be transmitted over wireless shared media 122-1. Power amplifiers 306-1, 306-2 may work in all assigned frequency bands, such as 4 frequency bands in a quad-band system. Power amplifiers 306-1, 306-2 may also operate in various modulation modes, such as Gaussian Minimum Shift Keying (GSMK) modulation suitable for GSM systems, 8-ary Phase Shift Keying (8-PSK) modulation suitable for EDGE systems, 16 Quadrature Amplitude Module (QAM) and/or Quadrature Phase Shift Keying (QPSK) for HSDPA, and so forth. The embodiments are not limited in this context.

In various embodiments, power amplifiers 306-1, 306-2 may be connected to an RF chipset 312. RF chipset 312 may also be connected to multiplexer 304. In one embodiment, for example, RF chipset 312 may comprise one or more transceivers in a transceiver array. For example, RF chipset 312 may include RF drivers 308-1, 308-2 each coupled to RF transceivers 310-1, 310-2, respectively. RF chipset 312 may perform modulation and direct conversion operations required for GMSK and 8-PSK signal types for quad-band E-GPRS radio, for example. RF chipset 312 receives analog I & Q signals from a baseband processor 314, and converts them to an RF signal suitable for amplification by power amplifiers 306-1, 306-2. Similarly, RF chipset 312 converts the signals received from wireless shared media 122-1 via antennas 302-1-*m* and multiplexer 304 to analog I & Q signals to be sent to baseband processor 314. RF chipset 312 may be implemented using one or more chips as desired for a given implementation. The embodiments are not limited in this context.

In some embodiments, each transceiver 310-1, 310-2 may be arranged to perform data communications in accordance with a different set of wireless communications protocols and techniques. In one embodiment, for example, transceiver 310-1 may be arranged to communicate information in accordance with a first class of wireless communications protocols and techniques that are generally associated with cellular radiotelephone communication systems. Examples of the first class of protocols may include WWAN protocols, such as GSM/GPRS protocols, CDMA/1×RTT protocols, EDGE protocols, EV-DO protocols, EV-DV protocols, HSDPA protocols, and so forth. In one embodiment, for example, transceiver 310-2 may be arranged to communicate information in accordance with a second class of wireless communications protocols and techniques that are generally associated with a computer network. Examples of the second class of protocols may include WLAN protocols, such as one or more of the IEEE 802.xx series of protocols, such as IEEE 802.11a/b/g/n, IEEE 802.16, IEEE 802.20, and so forth. Other examples of the second class of protocols may include PAN protocols, Infrared protocols, Bluetooth protocols, EMI protocols including passive or active RFID protocols, and so forth. It may be appreciated that although the various protocols have been generally separated into a first class and a second class, it may be appreciated that transceivers 310-1, 310-2 may be arranged to use any type of protocol from either class as desired for a given implementation. It may also be appreciated that although RF chipset 312 is shown with two transceivers 310-1, 310-2 by way of example, RF chipset 312 may be implemented using more or less transceivers as desired for a given implementation. The embodiments are not limited in this respect.

In various embodiments, RF chipset 312 may be connected to baseband processor 314. Baseband processor 314 may perform baseband operations for radio sub-system 202. Baseband processor 314 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, GMSK modulators, GPRS ciphers, transceiver controls, automatic frequency control (AFC), automatic gain control (AGC), power amplifier (PA) ramp control, and other circuits. The embodiments are not limited in this context.

In various embodiments, baseband processor 314 may also be connected to one or more memory units via a memory bus 320. In one embodiment, for example, baseband processor 314 may be connected to a flash memory unit 316 and a secure digital (SD) memory unit 318. Memory units 316, 318 may be removable or non-removable memory. In one embodiment, for example, baseband processor 314 may use approximately 1.6 megabytes of static read-only memory (SRAM) for E-GPRS and other protocol stack needs.

In various embodiments, baseband processor 314 may also be connected to a subscriber identity module (SIM) 322. Baseband processor 314 may have a SIM interface for SIM 322. SIM 322 may comprise a smart card that encrypts voice and data transmissions and stores data about the specific user so that the user can be identified and authenticated to the network supplying voice or data communications. SIM 322 may also store data such as personal phone settings specific to the user and phone numbers. SIM 322 can be removable or non-removable. The embodiments are not limited in this context.

In various embodiments, baseband processor 314 may further include various interfaces for communicating with a host processor of processing sub-system 206. For example, baseband processor 314 may have one or more universal asynchronous receiver-transmitter (UART) interfaces, one or more control/status lines to the host processor, one or more control/data lines to the host processor, and one or more audio lines to communicate audio signals to an audio sub-system of processing sub-system 206. The embodiments are not limited in this context.

Figure 4:
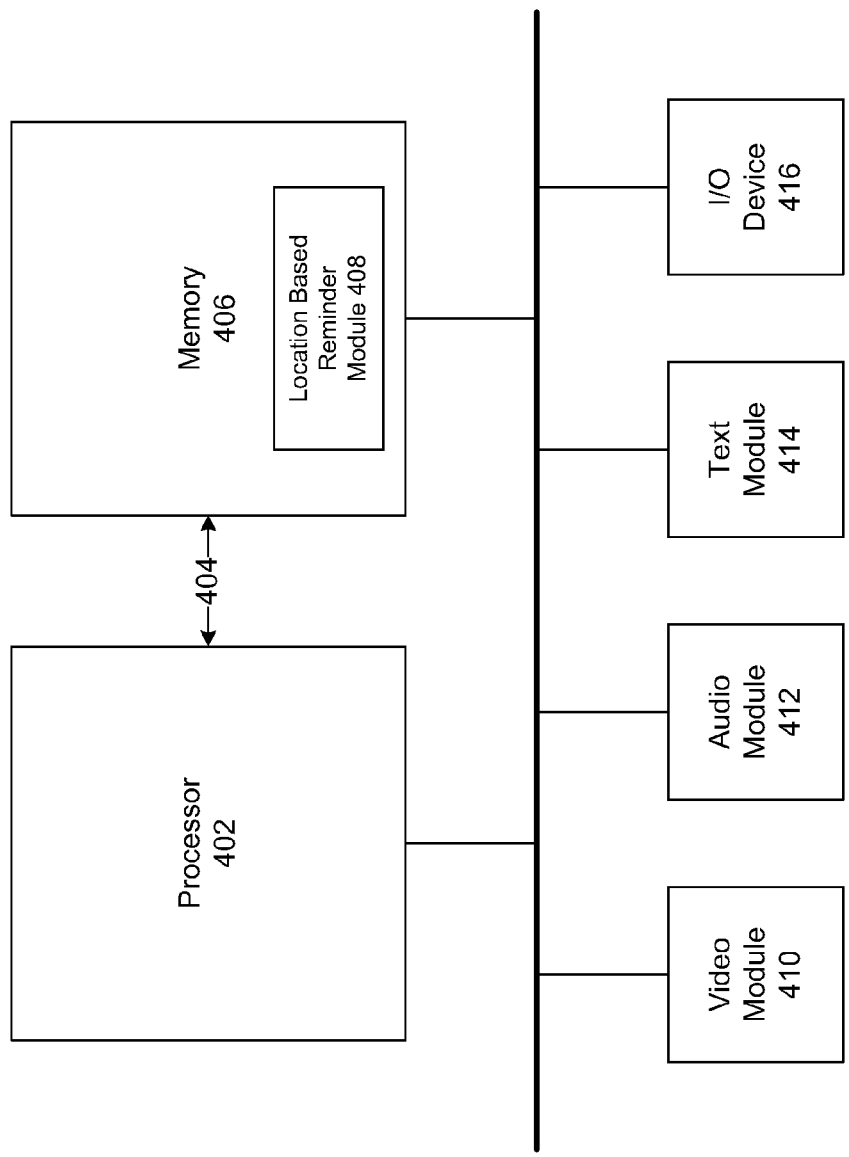
FIG. 4 illustrates one embodiment of a processing sub-system.

FIG. 4 illustrates one embodiment a processing sub-system. FIG. 4 illustrates a more detailed block diagram of processing sub-system 206 as described with reference to FIG. 2. Processing sub-system 206 may provide computing or processing operations for mobile computing device 110. For example, processing sub-system 206 may be arranged to execute various software programs for mobile computing device 110. Although processing sub-system 206 may be used to implement certain operations for various embodiments as software executed by a processor, it may be appreciated that the operations performed by processing sub-system 206 may also be implemented using hardware circuits or structures, or a combination of hardware and software, as desired for a particular implementation. The embodiments are not limited in this context.

In various embodiments, mobile computing device 110 may be capable of executing various types of software programs using processing sub-system 206. Software programs may be generally grouped into application programs and system programs. Application programs allow a user to accomplish one or more specific tasks. Typical applications include office suites, business software, educational software, databases, communications software, computer games, and so forth. Examples of application programs may include mail programs, web browsers, personal information manager applications, calendar programs, scheduling programs, contact management programs, gaming programs, word processing programs, spreadsheet programs, picture management programs, video reproduction programs, audio reproduction programs, groupware programs, and so forth. Most application software has a graphical user interface (GUI) to communicate information between a device and a user. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, and so forth.

In various embodiments, processing sub-system 206 of mobile computing device 110 may be capable of executing various types of system programs, such as different OS. In computing, an OS is the system software responsible for the direct control and management of hardware and basic system operations. Additionally, it provides a foundation upon which to run application software such as word processing programs and web browsers. Mobile computing device 110 may utilize any OS suitable for smaller form factor devices, such as a Palm OS®, Palm OS® Cobalt, Microsoft Windows® CE, Microsoft Pocket PC, Symbian OS™, Embedix OS, Linux, and others. The embodiments are not limited in this context.

In various embodiments, processing sub-system 206 may include various elements potentially useful in creating a memo. As shown in FIG. 4, processing sub-system 206 may include a video module 410, an audio module 412, a text module 414, and an I/O module 416. Elements 410, 412, 414 and 416 may have various sub-elements needed to create a reminder item for a particular modality or input. For example, video module 410 may be used to form a video reminder item, and may include a camera, a microphone, a speaker, a video coder/decoder (codec), a video player, and so forth. Audio module 412 may be used to form an audio reminder item, and may include a microphone, a speaker, an audio codec, an audio player, and so forth. Text module 414 may be used to form a text reminder item, and may include a text interface, such as a handwriting recognizer, a keyboard, an alphanumeric keypad such as used in cellular telephones, a touch screen, a mouse, a pointing device, cursor control, hard buttons, soft buttons, switches, and so forth. I/O device 416 may include any desired input and output elements that may be accessible or shared by elements of mobile computing device 110, such as video module 410, audio module 412, and/or text module 414. For example, I/O module 416 may include a thumb keyboard, a four-way navigation button, dedicated hardware buttons or switches, a camera, a microphone, a speaker, a display, a touch screen, and so forth.

In various embodiments, processing sub-system 206 may include processor 402. Processor 402 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 402 may be implemented as a general purpose processor, such as a processor made by Intel® Corporation, Santa Clara, Calif. Processor 402 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing sub-system 206 may include memory 406 to connect to processor 402. Memory 406 may be implemented using any machine-readable or computer-readable media capable of storing data, including both volatile and non-volatile memory. For example, memory 406 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 406 may be included on the same integrated circuit as processor 402 thereby obviating the need for bus 404. Alternatively some portion or all of memory 406 may be disposed on an integrated circuit or other medium, for example a hard disk drive, that is external to the integrated circuit of processor 402, and processor 402 may access memory 406 via memory bus 404. The embodiments are not limited in this context.

In various embodiments, memory 406 may store one or more software components. A software component may refer to one or more programs, or a portion of a program, used to implement a discrete set of operations. In one embodiment, for example, memory 406 may include one or more software components, such as a location based reminder module (LBRM) 408. LBRM 408 may be responsible for certain location based reminder operations for mobile computing device 110. It is worthy to note that although some embodiments may be described as software components executed by processing sub-system 206, it may be appreciated that some or all of the operations of the software components may be implemented using other processors accessible by mobile computing device 110, such as baseband processor 314, for example. Furthermore, these modules may also be implemented using dedicated hardware circuits or structures, or a combination of dedicated hardware and software, as desired for a given implementation. The embodiments are not limited in this context.

Figure 5:
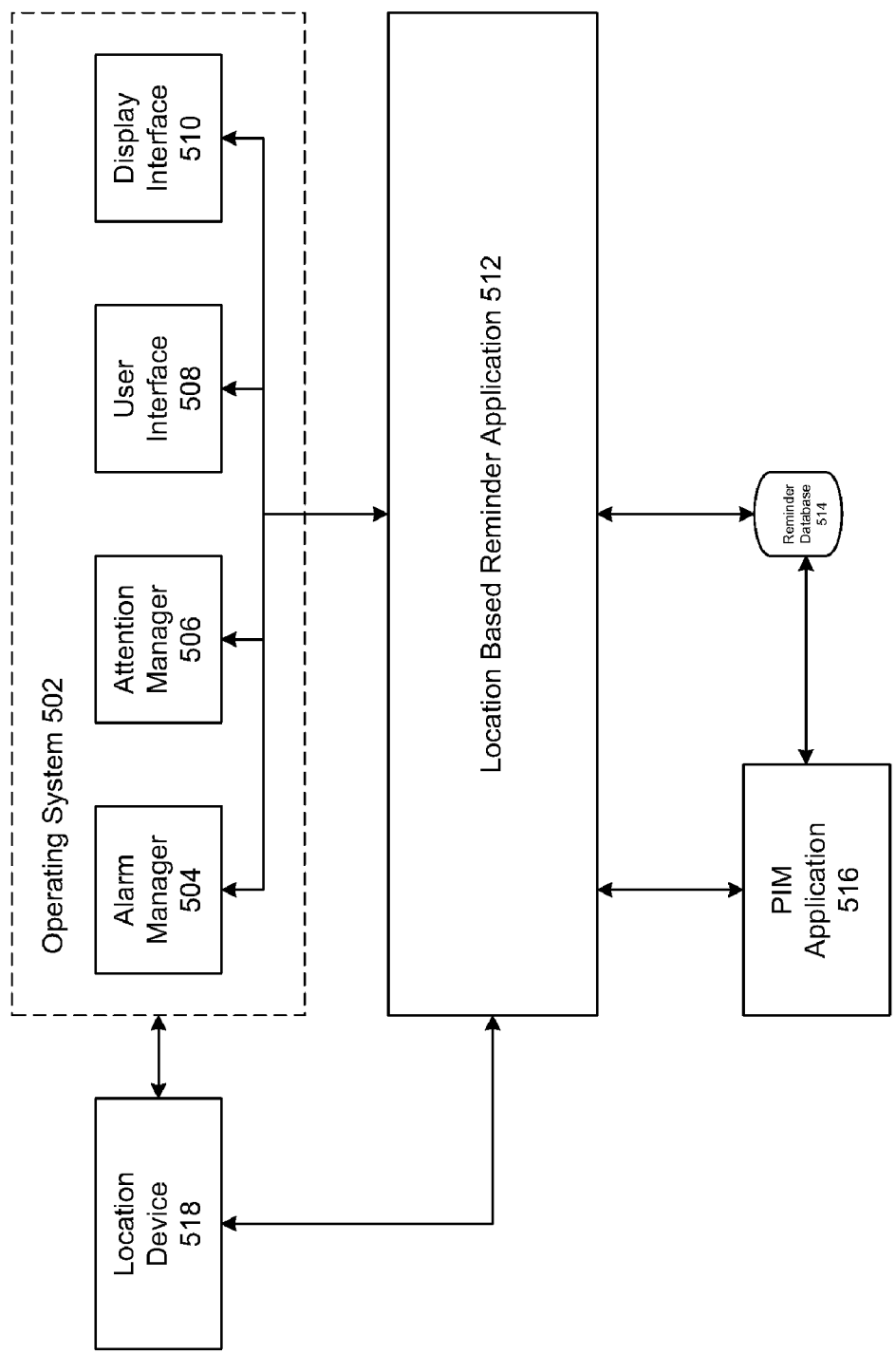
FIG. 5 illustrates one embodiment of a location based reminder module.

FIG. 5 illustrates one embodiment of a location based reminder module. FIG. 5 illustrates an example for LBRM 408. As shown in FIG. 5, LBRM 408 includes an OS 502, a location based reminder application (LBRA) 512, a reminder database 514, a PIM application 516, and a location device 518. OS 502 includes an alarm manager 504, an attention manager 506, a user interface 508, and a display interface 510. It may be appreciated that the elements of OS 502 may also be implemented as part of LBRA 512, or LBRA 512 as part of OS 502, or some combination thereof, and such combinations would still fall within the scope of the embodiments.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

In various embodiments, LBRM 408 may include reminder database 514. Reminder database 514 may be used to store reminder information, such as various reminder items and corresponding location information, such as target locations, target location names, target location information, and any other desired location information. LBRA 512 and/or PIM application 516 may store reminder information in reminder database 514. Alternatively, LBRA 512 and/or PIM application 516 may store reminder information in other databases, lists, tables, or other data structures, such as part of an existing PIM database, a shared database, a relational database, and so forth.

In various embodiments, LBRM 408 may include LBRA 512 coupled to reminder database 514. LBRA 512 may be arranged to manage reminders for mobile computing device 110. More particularly, LBRA 512 may be arranged to provide location based reminders for reminder items based on a location. The reminder items may be created or generated by any suitable application or system software implemented for mobile computing device 110, such as LBRA 512, PIM application 516, a memo application, and so forth. The reminder items may be created or generated using, for example, one or more of video module 410, audio module 412, and/or text module 414. Consequently, the reminder item may comprise any form of text-based or multimedia-based reminder item. Alternatively, LBRA 512 may receive one or more reminder items from another application, such as one or more components of OS 502, for example.

Once a reminder item has been created, a user may associate or set a target location with the reminder item. The target location may be represented using any suitable type of unique target location name and location information. The location information may refer to any information used to uniquely identify a physical location, such as an address, a map address, latitude coordinates, longitude coordinates, altitude or elevation information, and so forth. The location information may have any desired level of granularity and detail capable of being handled by location device 518 and as desired for a given implementation. LBRA 512 may store the reminder item and corresponding target location name and location information in reminder database 514.

In some embodiments, LBRA 512 may also set a location reminder value for the reminder item as well. The location reminder value may be a status flag used to indicate whether a target location has been stored with the reminder item. For example, the location reminder value may be set to a logical one (1) to indicate that the reminder item has a corresponding target location, a logical zero (0) to indicate that the reminder item does not have a corresponding target location, or vice-versa. LBRA 512 may store the reminder item with the corresponding location reminder value in reminder database 514. LBRA 512 may use the location reminder value to facilitate searches through larger volumes of reminder items to determine whether a sub-set of reminder items have an associated target location. LBRA 512 may then more closely search the sub-set of reminder items during matching operations when determining whether to provide a location based reminder, such as during location matching operations, for example.

In various embodiments, OS 502 of LBRM 408 may be coupled to location device 518. Location device 518 may be arranged to generate current location information for mobile computing device 110. Current location information may include any of the information previously defined for target location information. The specific type of location information used for both the current location information and target location information may vary as long as they correspond with each other sufficiently to perform location matching operations. Location device 518 may be implemented as any device capable of identifying or determining a current location for mobile computing device 110 at any given moment in time. In one example, location device 518 may be implemented as a global positioning satellite (GPS) system including a GPS transceiver. In another example, location device 518 may be implemented using hardware and/or software arranged to use one or more triangulation techniques capable of triangulating a position based on one or more known coordinates, such as cell data as used in cellular radiotelephone systems, for example. In yet another example, location device 518 may generate current location information from user input, such as entering coordinates or tapping on a map. A user might enter a user command into mobile computing device 110 to "learn" a location, such as entering the user command when at the home or office. The learned locations may be assigned a corresponding name (e.g., home, office, and so forth), and a GUI may allow the user to select the location by name from a drop down menu or other convenient user interface technique. Once mobile computing device 110 generates the location information, location device 518 may output the current location information to alarm manager 504 of OS 502 and/or LBRA 512 directly.

In various embodiments, OS 502 of LBRM 408 may include alarm manager 504. Alarm manager 504 may be coupled to LBRA 512 and location device 518. Alarm manager 504 may manage alarm operations for OS 502 of mobile computing device 110. More particularly, alarm manager 504 may perform location matching operations in order to generate an alarm for LBRM 408. Alternatively, the location matching operations may be performed by LBRA 512 using input received directly from location device 518. An application or user may use alarm manager 504 to set various reminders or alarms. Alarm manager 504 may include, for example, a timer and/or a message interface. Alarm manager 504 may also receive input from location device 518 in the form of current location information. Alarm manager 504 may use the current location information from location device 518, the timer, and/or message interface to send an alarm message when the output of a location matching operation is positive, such as when a target location matches a current location.

LBRA 512 may schedule an alarm to indicate when a target location for a reminder item matches a current location with alarm manager 504. For example, a user may use LBRA 512 and/or alarm manager 504 to set a location based reminder for a certain target location, such as a specific grocery store located at a certain address. Alarm manager 504 may receive current location information for mobile computing device 110 via location device 518. Alarm manager 504 may receive the current location information on a periodic basis, a periodic basis, continuous basis, request or demand basis, at random intervals, and so forth. A particular frequency controlling when location device 518 provides current location information to alarm manager 504 may vary, but may generally be set based on the size and proximity of the target location. For example, a larger defined target location such as a shopping mall may update the current location less frequently than a smaller defined target location such as a specific office suite. The embodiments are not limited in this context.

Alarm manager 504 may compare the current location with the target location programmed by LBRA 512. In our previous example, when the current location comprises the specific grocery store located at the certain address, thereby signifying a match of the current location with the target location, alarm manager 504 may send an alarm message to LBRA 512 to indicate a need for a location based reminder. In some cases, alarm manager 504 may also send an alarm message to attention manager 506 or display interface 510 thereby directly bypassing LBRA 512.

LBRA 512 may also schedule an alarm to indicate when a target location for a reminder item does not match a current location with alarm manager 504. For example, a user may use LBRA 512 and/or alarm manager 504 to set a location based reminder for a certain target location, such as a work location at a certain address. Alarm manager 504 may receive current location information for mobile computing device 110 via location device 518. Alarm manager 504 may compare the current location with the target location programmed by LBRA 512. When the target location no longer matches the current location, alarm manager 504 may send an alarm message to indicate a need for a location based reminder. In this manner, a user may be reminded of a task when leaving a location, such as picking up grocery items when leaving a work location.

In addition to a target location as a location based reminder trigger, LBRA 512 may also schedule a location based reminder with alarm manager 504 with other reminder triggers. For example, LBRA 512 may schedule a date and/or time as a reminder trigger in addition to the location trigger. In this case, LBRA 512 may record a date and/or time for the alarm in addition to the target location. For example, a user may desire to receive a location based reminder when near a specific grocery store located at the certain address on a certain date and/or time. Alarm manager 504 may perform location matching operations. When alarm manager 504 has a positive match, alarm manager 504 may use the timer to determine a current date and/or time. Alarm manager 504 may compare the current date and/or time with the programmed date and/or time, and if there is a match, then alarm manager 504 may send an alarm message to LBRA 512, attention manager 506, or display interface 510 directly. In another example, LBRA 512 may schedule a distance from the target location as a reminder trigger. LBRA 512 may be used to define a location based reminder distance value, with the location based reminder distance value to define a certain radius or distance surrounding the target location. For example, a user may set a reminder trigger to trigger a location based reminder when within 1 mile of the target location. Any value may be used for the location based reminder distance value as desired for a given reminder item. The embodiments are not limited in this context.

In various embodiments, OS 502 of LBRM 408 may include attention manager 506. Attention manager 506 may be coupled to LBRA 512. Attention manager 506 may provide an attention indicator to attract the attention of a user. The attention indicator may comprise a visual, audible and/or tactile indicator. A visual indicator may include providing visual information on display 104. For example, attention manager 506 may cause a visual indicator such as a blinking symbol or icon to occur somewhere on display 104, such as a highlighted asterisk symbol blinking in the top left hand corner of display 104. Attention manager 506 may be used to indicate that there are messages waiting for review by a user, such as email messages, voicemail messages, text messages, instant messages, and so forth. An audible indicator may include a voice message, tone, ring tone, beep, or some other audible information capable of being reproduced by audio module 412. A tactile indicator may include causing housing 102 to vibrate or pulse.

Attention manager 506 may also be used to provide visual, audible and/or tactile attention indicators to attract the attention of a user and indicate that there are location based reminders to be reviewed by the user. Assume that alarm manager 506 sends an alarm message to LBRA 512 indicating that the current location and/or current date and/or time for mobile computing device 110 matches the target location, date and/or time, and/or location based reminder distance value associated with the reminder item. LBRA 512 may send an attention request message to attention manager 506. Attention manager 506 may receive the attention request message, and provide an attention indicator to display interface 510 and/or display 104 in an attempt to attract the attention of a user.

In various embodiments, OS 502 of LBRM 408 may include user interface 508. User interface 508 may be coupled to LBRA 512 and/or attention manager 506. User interface 508 may be a graphic user interface (GUI) or some other user interface that is capable of conveying information to a user and receiving user commands from a user (e.g., via I/O 416). In response to an attention indicator provided by attention manager 506, a user may use user interface 508 to provide a user command in response to the indicator. For example, if the indicator is a blinking symbol or icon provided in a top left hand corner of display 104, and display 104 is a touch screen display, a user may tap the blinking symbol or icon in order to acknowledge the indicator from attention manager 506. User interface 508 may receive the user command, and send the user command to attention manager 506. Attention manager 506 may generate and send an attention response message to the attention request message provided by LBRA 512, with the attention response message conveying or indicating that a user command has been received.

LBRA 512 may receive the attention response message from attention manager 506, and initiate operations to search reminder database 514 for any reminder items with the relevant target location. LBRA 512 may search reminder database 514 for any reminder items with set location reminder values to accelerate search operations. LBRA 512 may provide a location based reminder for the located reminder items. The location based reminder may comprise a visual location based reminder, an audible location based reminder, or a tactile location based reminder. In one embodiment, for example, LBRA 512 may provide a location based reminder via display interface 510 and/or display 104. The location based reminder may comprise any desired user interface message format and accompanying information. For example, the location based reminder might be a user interface message such as "There are 4 reminder items associated with your current location at address 123 Main Street, Sunnyvale, Calif." with an accompanying list of the reminder items. A user may use user interface 508 to select a particular reminder item to retrieve further information for a location based reminder, or otherwise processor or handle a given location based reminder.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
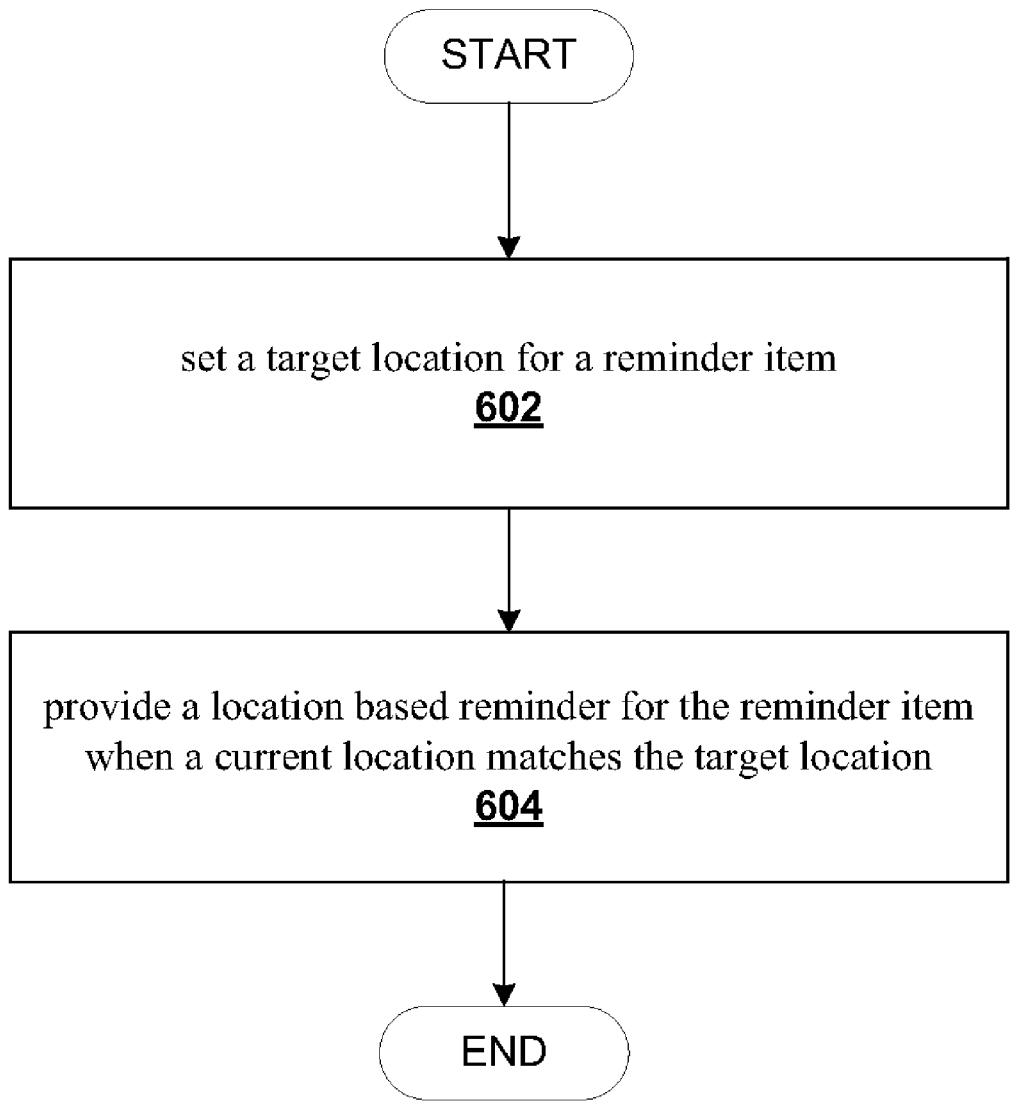
FIG. 6 illustrates one embodiment of a logic diagram.

FIG. 6 illustrates one embodiment of a logic flow. FIG. 6 illustrates a logic flow 600. Logic flow 600 may be representative of the operations executed by one or more embodiments described herein, such as mobile computing device 110. As shown in logic flow 600, a target location may be set for a reminder item at block 602. The reminder item may be stored with the target location in a reminder database. A location based reminder may be provided for the reminder item when a current location matches the target location at block 604. The embodiments are not limited in this context.

In one embodiment, block 604 may be implemented by receiving an alarm message if the current location matches the target location. An attention request message may be sent. An attention response message may be received. The reminder database may be searched for any reminder items with the target location. A list of reminder items with the target location may be displayed. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
a location based reminder application to set a target location for a reminder item, said target location comprising a location other than a current location for the mobile computing device, and provide a location based reminder for said reminder item when said current location matches said target location; and
an attention manager coupled to said location based reminder application, said location based reminder application to receive an alarm message indicating that said current location matches said target location, and send an attention request message to said attention manager, said attention manager to provide an attention indicator.

2. The mobile computing device of claim 1, comprising a location device coupled to said location based reminder application, said location device to determine said current location of said mobile computing device.

3. The mobile computing device of claim 1, comprising an alarm manager coupled to said location based reminder application, said location based reminder application to schedule an alarm with said alarm manager to indicate when said current location matches said target location.

4. The mobile computing device of claim 1, said location based reminder comprising a visual reminder, an audible reminder, or a tactile reminder.

5. A mobile computing device, comprising:
a location based reminder application to set a target location for a reminder item, said target location comprising a location other than a current location for the mobile computing device, and provide a location based reminder for said reminder item when said current location matches said target location; and a user interface coupled to an attention manager, said user interface to receive a user command in response to an attention indicator and provide said user command to said attention manager, said attention manager to send an attention response message to said location based reminder application.

6. A mobile computing device, comprising:

a location based reminder application to set a target location for a reminder item, said target location comprising a location other than a current location for the mobile computing device, and provide a location based reminder for said reminder item when said current location matches said target location;

said location based reminder application to receive an attention response message, search a reminder database for a reminder items with said target location, and provide a location based reminder for said reminder items with said target location.

7. A mobile computing device, comprising:

an antenna;

a radio sub-system;

a processing sub-system coupled to said radio sub-system, said processing sub-system to include a processor and memory, said memory to store a location based reminder application, said processor to execute said location based reminder application to set a target location for a reminder item, said target location comprising a location other than a current location for the mobile computing device, and provide a location based reminder for said reminder item when said current location matches said target location; and an alarm manager, an attention manager, and a user interface, said alarm manager to provide alarms to said location based reminder application when said current location matches said target location, said attention manager to provide an attention indicator in response to an attention request message from said location based reminder application, and said user interface to send a user command in response to said attention indicator to said attention manager, said attention manager to send an attention response message to said location based reminder application.

8. The mobile computing device of claim 7, comprising a location device coupled to said location based reminder application, said location device to determine said current location of said mobile computing device.

9. A mobile computing device, comprising:

an antenna;

a radio sub-system;

a processing sub-system coupled to said radio sub-system, said processing sub-system to include a processor and memory, said memory to store a location based reminder application, said processor to execute said location based reminder application to set a target location for a reminder item, said target location comprising a location other than a current location for the mobile computing device, and provide a location based reminder for said reminder item when said current location matches said target location; and a touch screen display coupled to said processing sub-system, said touch screen display to display said attention indicator, receive a user command in response to said attention indicator, and display a list of reminder items with said target location received from said location based reminder application.

10. A method, comprising:

setting a target location for a reminder item, said target location comprising a location other than a current location for the mobile computing device; and providing a location based reminder for said reminder item when a current location matches said target location;

receiving an alarm message if said current location matches said target location;

sending an attention request message;

receiving an attention response message;

searching said reminder database for a reminder items with said target location; and providing a location based reminder for said reminder items with said target location.

11. The method of claim 10, comprising storing said reminder item with said target location in a reminder database.

12. The method of claim 10, comprising:

receiving an alarm message if said current location matches said target location;

searching said reminder database for a reminder items with said target location; and providing a location based reminder for said reminder items with said target location.

13. The method of claim 10, comprising displaying a list of reminder items with said target location.

14. An article comprising a machine-readable storage medium containing instructions that if executed enable a system to set a target location for a reminder item, said target location comprising a location other than a current location for the mobile computing device, and provide a location based reminder for said reminder item when said current location matches said target location, receive an alarm message if said current location matches said target location, send an attention request message, receive an attention response message, search said reminder database for reminder items with said target location, and provide a location based reminder for said reminder items with said target location.

15. The article of claim 14, further comprising instructions that if executed enable the system to store said reminder item with said target location in a reminder database.

16. The article of claim 14, further comprising instructions that if executed enable the system to receive an alarm message if said current location matches said target location, search a reminder database for reminder items with said target location, and provide a location based reminder for said reminder items with said target location.

* * * * *